Patented June 16, 1931

1,810,402

UNITED STATES PATENT OFFICE

FRITZ ROTHE AND HANS BRENEK, OF BERLIN, GERMANY, ASSIGNORS TO THE FIRM: RHENANIA-KUNHEIM VEREIN CHEMISCHER FABRIKEN AKTIENGESELLSCHAFT, BERLIN, GERMANY

PROCESS FOR OBTAINING ALUMINA AND PHOSPHATES

No Drawing. Application filed July 22, 1927, Serial No. 207,809, and in Germany July 30, 1926.

This invention has reference to the process for obtaining alumina and phosphates, which may be used as fertilizers, from aluminum phosphates, which consists in subjecting alumina phosphates mixed with alkaline earth metal oxides and alkaline metal oxides to a heating.

The invention comprises an improvement of this process which consists in carrying out the reaction above referred to in the presence of steam. It has been found that hereby the reaction will be considerably favoured and that it is possible to make use of salts, which are more difficult to be decomposed than the carbonates, as alkali and alkaline earth metal compounds, if the reaction takes place in the presence of steam. Thus it is possible to utilize the cheaper alkali metal sulphates and alkaline earth metal sulphates either alone or in mixture with the carbonates, other salts or the oxides of the alkali metal and alkaline earth metal. Due to the action of the steam upon the mixture a complete decomposition of the sulphates can be obtained. Hereby $SO_3$ is freed and escapes. It may be utilized as sulphurous acid. Also the chlorides are used with advantage. In this case HCl is obtained as by-product, which may be utilized as hydrochloric acid. The process is carried out at sintering temperatures for the mixture.

The steam may be introduced into the heating flame and conducted over the mixture to be heated. It is of special advantage to cause the steam to act upon the mixture just in the moment of sintering. It is also possible to use such fuels for heating the mixture which contain such abundant volumes of hydrogen and form so much steam upon their combustion, that the need of a special steam supply is rendered unnecessary. Examples of such fuels are water-gas, oil gas, lignite producer gas or the like.

The most favourable result will be obtained if the proportions in the crude mixture containing alumina phosphate, alkaline earth metal compounds and alkali metal compounds are chosen in such a manner, that there are present for every molecule of $P_2O_5$ 2 molecules of alkaline earth metal oxide and 1 molecule of alkali metal oxide and for 1 molecule of $Al_2O_3$ an additional molecule of alkali metal oxide. In this manner alkali dicalciumphosphate is obtained, if calciumoxide is used as alkaline earth compounds. In cases where the material to be treated contains silica, there must be added such a further quantity of alkaline earth metal oxide, that alkaline earth metal orthosilicate ($2RO.SiO_2$) can be formed.

An example illustrating the mode in which the invention can be carried into practice is as follows:—

100 parts of a South African aluminum phosphate having the following composition: 22.8% of $H_2O$; 34.7% of $P_2O_5$; 32.4% of $Al_2O_3$; 4.8% of $Fe_2O_3$; 2.5% of $SiO_2$; 3.2% of CaO (not combined with phosphoric acid) were mixed in powdered state with 66 parts of anhydrous gypsum corresponding to 2 molecules of CaO referred to $P_2O_5$, 36 parts of $Na_2SO_4$ corresponding to 1 molecule of $Na_2O$ referred to $P_2O_5$, and an additional 45 parts of $Na_2SO_4$ corresponding to 1 molecule of $Na_2O$ referred to $Al_2O_3$, and 3.66 parts of gypsum to bind the silica as orthosilicate. This mixture was calcined at a temperature of about 1200° C. for from 1 to 2 hours in a current of steam. From the calcined product, in 100 parts of which there were 23 parts of $Al_2O_3$, 22.5 parts were dissolved out in the form of sodium aluminate by treatment with water, thus affording a yield of about 98%. The phosphoric acid in the residue was practically completely citrate-soluble.

The same result is obtained if the calcium sulphate be replaced by calcium chloride, and the sodium sulphate by sodium chloride, or if only one of the sulphates be replaced by a chloride.

What we claim and desire to secure by Letters Patent of the United States is:

1. A process for obtaining alumina and phosphates which may be used as fertilizers, from aluminum phosphate comprising subjecting a mixture of aluminium phosphates and alkaline earth metal compounds and alkali metal compounds to a heating at sintering temperatures for said mixture in the presence of steam.

2. A process for obtaining alumina and prosphates which may be used as fertilizers, from aluminum phosphate comprising subjecting a mixture of aluminium phosphates and alkaline earth metal sulphates and alkali metal sulphates to a heating at sintering temperatures for said mixture in the presence of steam.

3. A process for obtaining alumina and phosphates which may be used as fertilizers, from aluminium phosphate comprising subjecting a mixture of aluminium phosphates; alkaline earth metal sulphates, other alkaline earth metal salts, alkali metal sulphates and other alkali metal salts to a heating at sintering temperatures for said mixture in the presence of steam.

4. A process for obtaining alumina and phosphates which may be used as fertilizers, from aluminium phosphate comprising subjecting a mixture of aluminium phosphates and alkaline earth metal salts and alkali salts to a heating at sintering temperatures for said mixture in the presence of steam, said mixture containing for 1 molecule of phosphoric acid 2 molecules of alkaline earth metal oxide and 1 molecule of alkali metal oxide and for 1 molecule of alumina a further molecule of alkali metal oxide.

5. A process for obtaining alumina and phosphates which may be used as fertilizers, from aluminium phosphate comprising subjecting a mixture of aluminium phosphates and alkaline earth metal sulphates and alkali metal sulphates to a heating at sintering temperatures for said mixture in the presence of steam, said mixture containing for 1 molecule of phosphoric acid 2 molecules of alkaline earth metal sulphate and 1 molecule of alkali metal sulphate and for 1 molecule of alumina a further molecule of alkali metal sulphate.

6. A process for obtaining alumina and phosphates which may be used as fertilizers, from aluminium phosphate comprising subjecting a mixture of aluminium phosphates and alkaline earth metal salts and alkali metal salts to a heating at sintering temperatures for said mixture in the presence of steam, said mixture containing such quantities of alkaline earth metal oxide that any silica present in the mixture can be bound as alkaline earth orthosilicate.

7. A process for obtaining alumina and phosphates which may be used as fertilizers, from aluminium phosphate comprising subjecting a mixture of aluminium phosphates and alkaline earth metal sulphates and alkali metal sulphates to a heating at sintering temperatures for said mixture in the presence of steam, said mixture containing such quantities of alkaline earth metal sulphate that any silica present in the mixture can be bound as alkaline earth orthosilicate.

8. A process for obtaining alumina and phosphates which may be used as fertilizers, from aluminium phosphate comprising subjecting a mixture of aluminium phosphates and alkaline earth metal salts and alkali metal salts to a heating at sintering temperatures for said mixture in the presence of steam, said mixture containing for 1 molecule of phosphoric acid 2 molecules of alkaline earth metal oxide and 1 molecule of alkali metal oxide and for 1 molecule of alumina a further molecule of alkali metal oxide and in addition thereto such quantities of alkaline earth metal oxide that any silica present in the mixture can be bound as alkaline earth orthosilicate.

9. A process for obtaining alumina and phosphates which may be used as fertilizers, from aluminium phosphate comprising subjecting a mixture of aluminium phosphates and alkaline earth metal sulphates and alkali metal sulphates to a heating at sintering temperatures for said mixture in the presence of steam, said mixture containing for 1 molecule or phosphoric acid 2 molecules of alkaline earth metal sulphate and 1 molecule of alkali metal sulphate and for 1 molecule of alumina a further molecule of alkali metal sulphate and in addition thereto such quantities of alkaline earth metal sulphate that any silica present in the mixture can be bound as alkaline earth orthosilicate.

10. A process for obtaining alumina and phosphates which may be used as fertilizers, from aluminium phosphate comprising subjecting a mixture of aluminium phosphates and alkaline earth metal salts and alkali salts to a heating at sintering temperatures for said mixture by the aid of fuels containing such amounts of hydrogen as to form sufficient steam at their combustion to act upon the mixture.

11. A process for obtaining alumina and phosphates which may be used as fertilizers, from aluminium phosphate comprising subjecting a mixture of aluminium phosphates, alkaline earth metal sulphates, other alkaline earth metal salts, alkali metal sulphates and other alkali metal salts to a heating at sintering temperatures for said mixture by the aid of fuels containing such amounts of hydrogen as to form sufficient steam at their combustion to act upon the mixture.

FRITZ ROTHE.
HANS BRENEK.